United States Patent [19]
Fykse et al.

[11] Patent Number: 6,159,603
[45] Date of Patent: Dec. 12, 2000

[54] METHOD FOR THE USE OF MATERIAL CONTAINING CARBON IN THE ELECTROLYTIC PRODUCTION OF ALUMINIUM

[75] Inventors: Nils Fykse; Hogne Linga; Kari Stette; Bodil Madslien, all of Årdalstangen; Bergitte Husa Kippernes, Ålvundeid; Lene Navestad Solli, Årdalstangen, all of Norway

[73] Assignee: Norsk Hydro ASA, Oslo, Norway

[21] Appl. No.: 09/091,248

[22] PCT Filed: Dec. 13, 1996

[86] PCT No.: PCT/NO96/00295

§ 371 Date: Sep. 25, 1998

§ 102(e) Date: Sep. 25, 1998

[87] PCT Pub. No.: WO97/22735

PCT Pub. Date: Jun. 26, 1997

[30] Foreign Application Priority Data

Dec. 15, 1995 [NO] Norway ..................... 955091

[51] Int. Cl.[7] .................. B32B 15/02; B32B 17/02; B32B 19/00
[52] U.S. Cl. ............. 428/403; 428/402; 428/320.2; 428/323; 428/325; 427/180; 427/212; 427/220; 427/215
[58] Field of Search .................. 428/403, 402, 428/320.2, 323, 325; 427/180, 212, 215, 220; 23/314, 313

[56] References Cited

U.S. PATENT DOCUMENTS

| | | | |
|---|---|---|---|
| 3,932,244 | 1/1976 | Mikkelsen | 156/71 |
| 4,483,840 | 11/1984 | Delhay et al. | 423/445 |
| 5,145,570 | 9/1992 | Jusufbegovic | 204/279 |
| 5,578,174 | 11/1996 | Sekhar | 204/243 R |

FOREIGN PATENT DOCUMENTS

| | | |
|---|---|---|
| 0378842 | 7/1990 | European Pat. Off. . |
| 1214885 | 4/1966 | Germany . |
| 77619 | 10/1950 | Norway . |
| 152013 | 4/1985 | Norway . |
| 179048 | 4/1996 | Norway . |
| 165743 | 10/1958 | Sweden . |
| 1468880 | 3/1977 | United Kingdom . |

*Primary Examiner*—William Krynski
*Assistant Examiner*—B. Shewareged
*Attorney, Agent, or Firm*—Wenderoth, Lind & Ponack, L.L.P.

[57] ABSTRACT

A method for the use of material containing carbon as a packing material, anode mass or collar mass in connection with the electrolytic production of aluminium. The material is formed by granulating a mass which contains carbon particles and a binder. The carbon particles may comprise a carbon material which has been returned from the aluminium production process. The binder may comprise tar which is collected in connection with burning anodes. The carbon particles may comprise butt filter dust and can contain contaminants such as sodium (Na) and fluorine (F). By adding a powder/dust which contains silicon oxide ($SiO_2$) to the mass, the contaminants can be rendered harmless. The added material can be formed by crushing and grinding used cassette stone (chamotte) to dust The present invention makes possible comprehensive reuse of several waste products of the electrolytic production of aluminium.

22 Claims, No Drawings

METHOD FOR THE USE OF MATERIAL CONTAINING CARBON IN THE ELECTROLYTIC PRODUCTION OF ALUMINIUM

A method for the use of material containing carbon in the electrolytic production of aluminium The present invention concerns a method for the use of material containing carbon as a packing material, anode mass or collar mass in the electrolytic production of aluminium.

At aluminium works throughout the world, large quantities of fine-grained material containing carbon, or carbon dust, are produced annually as a result of breakdown during handling and transportation, cleaning of anode remnants (butts) and collection in filters when cleaning air and waste gases.

Approximately 5–10% fine carbon dust is produced from the quantity of coke purchased annually. The majority of this dust cannot today be recycled or used. This is because the dust is difficult to handle and partly because the contaminants in the dust make it unsuitable for recycling in anodes. Today, the dust is dumped. In the future it will probably become more expensive to dump it and the legislation governing the dumping of waste will probably become stricter. Therefore, it is not possible to base plans on the continued dumping of large quantities of carbon dust.

It is desirable to be able to use the current carbon by-products as raw materials. If the dust were reused, the result would be better carbon production economy as well as better resource management. At the same time, the environment would be spared major negative impacts.

A great deal of the dust comes from crushing butts from the electrolysis process. The butts contain contaminants from the electrolysis bath which it is undesirable to return to, for example, the anode mass for prebaked anodes in the form of dust. If butts are recycled for anodes, they must be carefully cleaned before use, i.e. that part of the butts which contains too many contaminants from the bath must be removed. The bath contains large quantities of sodium (Na), which makes this material not very suitable for recycling in aluminium production. It has been shown that if the anode mass has too high a content of sodium when burned, the bath components can diffuse out from the anode in the baking process and change the physical properties of the fireproof stone in the cassette walls so that the furnace is broken down over time. Furthermore, the quality of the anodes will be reduced if they contain bath components. The bath contains large quantities of sodium (Na) and if the bath residues in the anode are exposed to moisture during production and storage, the reaction with sodium (Na) may lead to severe expansion which may, in extreme cases, divide an anode in two. The greatest problem with bath residues in anodes, however, is that sodium is a catalyst for the air and $CO_2$ reactivity of the anodes.

When burning anodes, a packing material is used to support the carbon bodies in the furnace chamber in order to avoid shape deviations. The packing material will also absorb volatile components which are liberated from the carbon during burning and be sacrificial material in connection with oxidation on account of the surplus oxygen in the furnace.

Coke, or packing coke, is today the most widespread packing material in connection with calcination of anodes for use in the aluminium industry. Coke can, for example, be produced in connection with the distillation of crude oil (petroleum coke).

Norwegion Patent No. 77.619 states that mixtures of coke ballast and bauxite powder, graphite, anthracite and clay soil can be used as a filling powder when burning carbon bodies. A further indication of weight ratios, etc. is also given.

A disadvantage of using coke as the packing material, possibly mixed with other materials as stated above, is that it results in the consumption of valuable raw materials.

Carbon dust cannot directly replace packing coke as the dust does not support the carbon and does not either maintain its position as well as larger grains of coke.

In order to protect the nipples on the anode hanger for an anode in an electrolysis cell, collar mass is used around the lower ends of the nipples on the top of the anode. Today it is most common to use a collar mass which consists of petroleum coke and a binder containing carbon.

One problem associated with the handling of fine-grained carbon material is that it can result in extensive production of dust, which seriously impairs the quality of the working environment.

If the dust could be converted into another, easier-to-handle form and the contaminants could be rendered harmless, it would be possible to recycle the waste.

It has been found that if the dust is pelletised using a binder, the dust can be used in new areas. If the dust is contaminated by sodium, the diffusion of sodium will be reduced if it is pelletised with a binder. Furthermore, it has been found that the addition of fine powder/dust of material containing silicon oxide to the mass which is to be pelletised contributes to rendering the contaminants harmless.

The waste gases produced in connection with burning anodes in an anode factory contain tar vapours which are collected in electrofilters. Tar also constitutes a by-product which cannot directly be used in production. Tar has been shown to be a suitable binder for the manufacture of pellets based on carbon dust.

Another waste problem in anode production for the aluminium industry is fireproof material (chamotte) from repairing (rewalling) ring chamber furnaces. Such rewalling usually takes place at intervals of several years and otherwise as required. In addition, there is continuous replacement of stone in connection with general maintenance. The quantity of fireproof materials repaired is typically 1–2% of the production volume in a furnace. Thus considerable quantities of stone are replaced. This stone is usually dumped.

Chamotte stone which is crushed and ground to the appropriate particle size (powder/dust) has proved to be suitable as a component in the mass which is pelletised as chamotte stone contains large quantities of silicon oxide. Silicon oxide has, as stated above, been shown to have good properties with regard to reducing the effect of contaminants to be found in, for example, butt filter dust.

The present invention concerns a method for the use of material containing carbon in the electrolytic production of aluminium as an anode mass, collar mass or packing material, where the material contains carbon in particle form and a binder, and where the carbon material is produced as granules in the form of pellets or similar before it is subsequently used as a packing material, anode mass or collar mass.

The material containing carbon can be produced from used carbon material in the form of particles or dust, possibly larger fragments which have been crushed and ground to dust, and allows the reuse of materials from the production of aluminium, in particular calcined carbon materials. The dust is a component in a mass containing a binder. Organic, carbon-based binders such as coal tar and pitch can be used as the binder. Tar collected during the burning of anodes can be used expediently. The mass is pelletised by being passed through a pellet press.

If the material containing carbon which is to be used during the production of granules contains contaminants of type sodium (Na) and fluorine (F), which are, for example, present in butt filter dust, the addition to the mass of a proportion of material containing silicon oxide in the form of powder or dust will contribute to reducing the effect of Na and F. The powder/dust can be produced by crushing and grinding chamotte stone. Chamotte powder/dust binds the catalytic contaminants in the butt filter dust so that the Na and F will react and bind with the chamotte in the pellets instead of forcing their way out to the cassette walls in the furnace when the mass is used as an anode mass or packing material. Used as a collar mass, the chamotte will reduce the air and $CO_2$ reactivity of the collars when they contain butt filter dust. This is very important because it is desirable to have as much of the collars left as possible when the butts are removed from the electrolysis furnaces. Tests carried out have shown that the reactivity of the pellets drops considerably when chamotte dust is added.

Used as a packing material, chamotte mixed in the pellets further contributes to giving the pellets good mechanical properties with regard to supporting the carbon bodies during burning.

Of the catalytic contaminants in the butt filter dust which can be expected to affect the reactivity of the pellets, Na is the most important as it exists in the very greatest quantity. Sodium is a strong catalyst for the reaction between C and $O_2$, and C and $CO_2$.

Silicon dioxide has been shown to inhibit Na's catalytic abilities by forming heavy, inhibiting complexes. From standard tables (the JANAF tables were used here) it has been proposed that the following equilibria can appear at the temperatures in question:

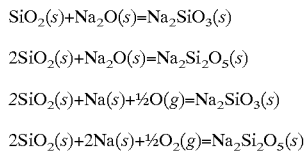

$SiO_2(s) + Na_2O(s) = Na_2SiO_3(s)$ $2SiO_2(s) + Na_2O(s) = Na_2Si_2O_5(s)$ $2SiO_2(s) + Na(s) + \frac{1}{2}O(g) = Na_2SiO_3(s)$ $2SiO_2(s) + 2Na(s) + \frac{1}{2}O_2(g) = Na_2Si_2O_5(s)$ In general, it can be said that the formation of sodium silicates is assumed. It is also possible to imagine the formation of Na—Al silicates as chamotte also contains $Al_2O_3$. A common feature of all the reactions is that the highly reactive sodium loses its catalytic abilities.

Regarding contaminants such as fluorine, completely different mechanisms apply as F is not such a catalyst for combustion as Na. Fluorine will be able to react with the chamotte in the material containing carbon (pellets).

Binder can be added to the mixture in a quantity equivalent to 15–30% by weight of the mixture.

Oil can be added to the mixture in a quantity equivalent to approximately 5% by weight of the mixture.

Packing material

In the following, an example is shown of production of a material containing carbon in accordance with the present invention for use as a packing material:

Butt filter dust containing carbon (<1 mm) in a quantity equivalent to 73% weight (70–74% weight) is heated to approximately 35–45 EC above the softening temperature of the binder. The dust is then placed in a mixer with heating, for example of type Sigma mixer or ko-Kneter. The thermostat is set so that the mixture maintains the desired temperature. Chamotte dust (<1 mm) is then added to the mixer in a quantity equivalent to 6% weight (up to approximately 15% weight). This added material comprises used cassette stone which has been crushed and ground in a ball grinder for ½–1 hour. The binder (pitch with a softening point of 63° C.) is weighed out in a quantity equivalent to 15% weight (approximately 15–18% weight) and heated up to approximately the same temperature as the dust as at this temperature it has a viscosity which produces good penetration into the dust and small quantities of volatile components are evaporated. The binder is distributed as well as possible while being mixed in. The mixture is processed until it has become a homogeneous mass. It is important that the content of binder is not too high as this can cause adhesion of the pellets during burning and problems removing the packing material from the furnace. A reduced binder content results in a "drier" mass during extrusion but this can be solved by adding oil or diesel. Diesel is added to the mass in a quantity equivalent to 6% weight (up to approximately 6% weight). Furthermore, diesel has been shown to produce less dust during the baking of the pellets from waste oil. It is important not to have much dust in the packing material because dust gives poor support to the anodes and nipple holes.

The mass is then passed through a pellet press. The optimal temperature before pressing the pellet mass with a low binder content is approximately 80–85° C.

The pellet press works according to the same principle as a mincer. The mass is fed in at the top of the machine and is pressed through a hole plate by means of a rotating wheel. "Spaghetti" is extruded and cut to the desired length. The most appropriate pellet size is 5–8 mm. After cooling, the pellets have good mechanical strength.

It should be understood here that a person skilled in the art will be able to adapt the operating parameters such as mixing temperature, shaping temperature, press pressure, rotation speed in the press, feed speed, particle size distribution of the dust, quantity of binder and its softening point and viscosity in accordance with the optimal pellet quality.

The pellets can be used as packing material in a "green state" or can be burned (calcined) before use. If pellets in a "green state" are used, the pellets will be calcined during the burning of the anodes. When the burning of the anodes has been completed, the packing material is sucked out of the furnace and collected in a container. The material containing carbon which is consumed during the burning is replaced by new pellets which are added to the container before the mixture is used as the packing material at the next burning. It should be understood that the pellets can be used as an independent packing material or in a mixture together with another material containing carbon such as packing coke.

Anode mass

Tests have shown that it is possible to use returned carbon material in a pelletised state as a component in the anode mass for prebaked anodes. The pellets can, for example, be mixed into the ordinary anode mass before it goes to the vibration moulds. If the pellets are produced from butt filter dust, it is important that the mixing takes place in such a way that the pellets are not crushed; otherwise, the sodium can lead to increased air and $CO_2$ reactivity for the anode.

Furthermore, it is important that the pellets are evenly distributed in the anode mass so that the anode is as homogeneous as possible. An accumulation of pellets in one area can lead to weakness of the anode. It has been shown that the quantity of binder in the pellets which are used for the anode mass is not a critical quantity as the proportion of pellets is very small in comparison with the overall anode mass, up to 6% weight. Full-scale tests which have been carried out with anodes which contain pellets based on butt filter dust, tar as the binder and added chamotte have shown that the anode consumption and air corrosion do not increase in comparison with reference anodes (without pellets). Typical values for the pellet mass will be 70–76% weight butt filter dust, 3–10% weight chamotte dust and 20–21.4% tar.

Collar mass

The collar mass protects the nipples from corrosion from the bath. In order to keep the collar mass in place around the nipples before it has hardened, a cardboard collar is used. When producing pellets for use as the collar mass, a higher content of binder in the mass is used. This is so that the pellets stick together and form a solid collar during baking in the electrolysis. If pitch is used as the binder, the relevant values for the binder content will be 26–30% weight. The pellets can be produced as stated above but the extruded mass must be cooled in order to avoid adhesion on account of the high binder content. Furthermore, the binder should have a softening point of approximately 40–75° C. so that the coking process starts early and the collar remains in place even though the cardboard collar burns away. If butt filter dust is used in the mass, it should contain enough chamotte to deactivate the sodium component so that the air and $CO_2$ reactivity do not increase. The quantity of chamotte must also be adapted with regard to the increased silicon content in the metal. The quantity of chamotte should be within the range 3–10% weight.

What is claimed is:

1. A method of producing a packing material, anode mass or collar mass, which comprises mixing carbon-containing particles resulting from electrolytic production of aluminum a binder, and silicon dioxide ($SiO_2$), and forming the resultant mixture into granules.

2. A method according to claim 1, wherein the granules are pellets.

3. A method in accordance with claim 1, wherein the carbon-containing particles further contain sodium (Na) and optionally fluorine (F), and the silicon dioxide is added to the mixture as a powder which contains the silicon dioxide.

4. A method in accordance with claim 1, wherein the carbon-containing particles are added in the form of butt filter dust.

5. A method in accordance with claim 1, wherein the carbon-containing particles are added in a quantity equivalent to 70–74% weight of the mixture.

6. A method in accordance with claim 3, wherein the powder containing silicon dioxide is added in a quantity equivalent to approximately 3–10% weight of the mixture.

7. A method in accordance with claim 3, wherein the powder containing silicon dioxide is formed by crushing and grinding chamotte stone.

8. A method in accordance with claim 1, wherein the binder is added in a quantity equivalent to 15–30% weight of the mixture.

9. A method in accordance with claim 1, wherein tar or pitch is added as the binder.

10. A method in accordance with claim 1, wherein oil in a quantity equivalent to approximately 5% weight is added to the mixture.

11. A method in accordance with claim 1, wherein the mixture is granulated to form pellets with a pellet press.

12. A method of producing a packing material, anode mass or collar mass, which comprises mixing carbon-containing particles resulting from electrolytic production of aluminum, a binder, and oil or diesel, and forming the resultant mixture into granules.

13. A method according to claim 12, wherein the granules are pellets.

14. A method in accordance with claim 12, wherein the carbon-containing particles further contain sodium (Na) and optionally fluorine (F), and a powder which contains silicon dioxide ($SiO_2$) is also added to the mixture.

15. A method in accordance with claim 12, wherein the carbon-containing particles are added in the form of butt filter dust.

16. A method in accordance with claim 12, wherein the carbon-containing particles are added in a quantity equivalent to 70–74% weight of the mixture.

17. A method in accordance with claim 14, wherein the powder containing silicon dioxide is added in a quantity equivalent to approximately 3–10% weight of the mixture.

18. A method in accordance with claim 14, wherein the powder containing silicon dioxide is formed by crushing and grinding chamotte stone.

19. A method in accordance with claim 12, wherein the binder is added in a quantity equivalent to 15–30% weight of the mixture.

20. A method in accordance with claim 12, wherein tar or pitch is added as the binder.

21. A method in accordance with claim 12, wherein the oil in a quantity equivalent to approximately 5% weight is added to the mixture.

22. A method in accordance with claim 12, wherein the mixture is granulated to form pellets with a pellet press.

* * * * *